Oct. 15, 1940.   D. M. ANDERSON   2,217,661
MOLDING AND EJECTING MEANS FOR THREADED ARTICLES
Filed Dec. 30, 1936   3 Sheets-Sheet 1

INVENTOR.
DWIGHT M. ANDERSON
BY
ATTORNEY.

Oct. 15, 1940.    D. M. ANDERSON    2,217,661
MOLDING AND EJECTING MEANS FOR THREADED ARTICLES
Filed Dec. 30, 1936    3 Sheets-Sheet 2
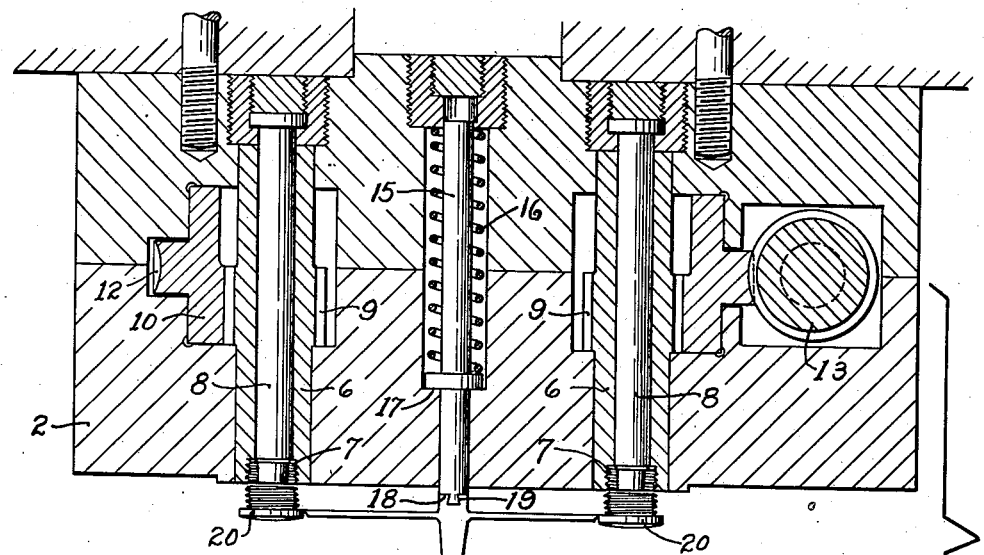
Fig. 3
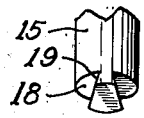
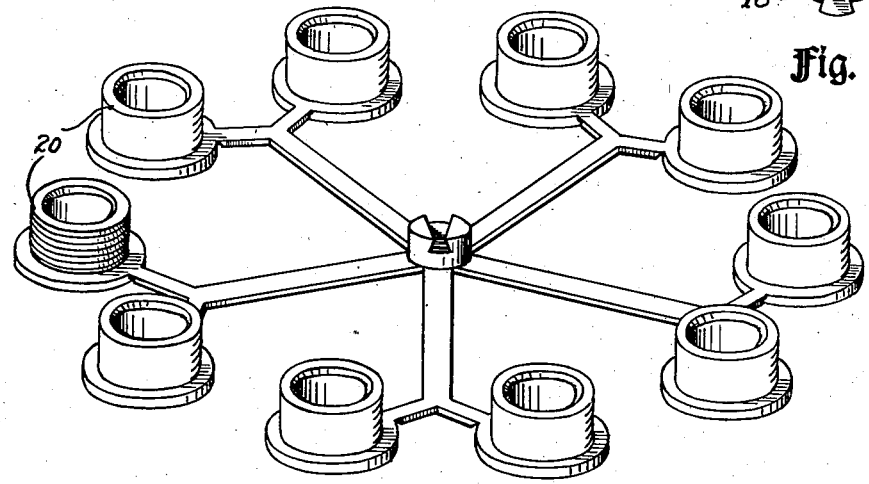
Fig. 4    Fig. 6
INVENTOR.
DWIGHT M. ANDERSON
BY
ATTORNEY.

Oct. 15, 1940.  D. M. ANDERSON  2,217,661
MOLDING AND EJECTING MEANS FOR THREADED ARTICLES
Filed Dec. 30, 1936  3 Sheets-Sheet 3

INVENTOR
DWIGHT M. ANDERSON
BY
his ATTORNEY

Patented Oct. 15, 1940

2,217,661

UNITED STATES PATENT OFFICE 2,217,661

MOLDING AND EJECTING MEANS FOR THREADED ARTICLES

Dwight M. Anderson, Cleveland Heights, Ohio, assignor, by mesne assignments, to The Standard Products Company, Port Clinton, Ohio, a corporation of Ohio Application December 30, 1936, Serial No. 118,381

5 Claims. (Cl. 18—42)

This invention relates to an apparatus for molding concurrently a plurality of articles having threaded portions, or for molding a single article having a plurality of transversely spaced thread portions, and for ejecting such articles efficiently from the mold cavity.

Heretofore in molding threaded articles, one practice has been to move the threaded portion of the mold bodily axially relative to the main mold section for separating the caps from the mold section, and thereupon unscrewing the caps individually from the threaded portions on which they are carried.

Likewise, attempts have been made to mold and eject such articles by providing threaded mold spindles which are unscrewed from the articles while the articles remain in the mold cavities of the main mold section, separate means then being employed to eject the articles from the cavities of the main mold section.

In all such instances, it was necessary either to individually rotate each article for removal from its cavity, or to effect two separate and independent steps for freeing the article from the screw threads and thereafter ejecting it in the customary manner from the cavity.

One of the principal objects of the present invention, therefore, is to provide an improved means for molding concurrently a plurality of such threaded articles and eject them from the mold cavities concurrently with the separation from, and by the action of, the threaded portions.

Another object is to mold threaded articles in a manner such that a plurality of the articles may be ejected concurrently and held together for convenience in subsequent handling and processing, thus effecting considerable saving in time and expense of manufacture.

Another object is to eject such articles from the mold through the medium of the screw action of the threads themselves and to utilize the mold gate material and sprue as part of the means for effecting the necessary relative rotation between the screw threads of the article and the corresponding threaded portions of the mold, whereby the ejecting forces are uniformly distributed and breakage and rejected articles are reduced.

Another specific object is to eject the articles from the mold and retain them in a condition for ready access and removal by the operator by the interconnecting gate and sprue material.

Other objects and advantages will become apparent from the following specification wherein reference is made to the drawings in which:

Fig 3 is a view similar to Fig. 1 showing the mold portions separated and the articles in ejected position;

Fig. 4 is an enlarged perspective view of the threaded articles as they are ejected from the mold;

Fig. 6 is a perspective view of an ejecting pin used in connection with the present apparatus;

Figure 1:
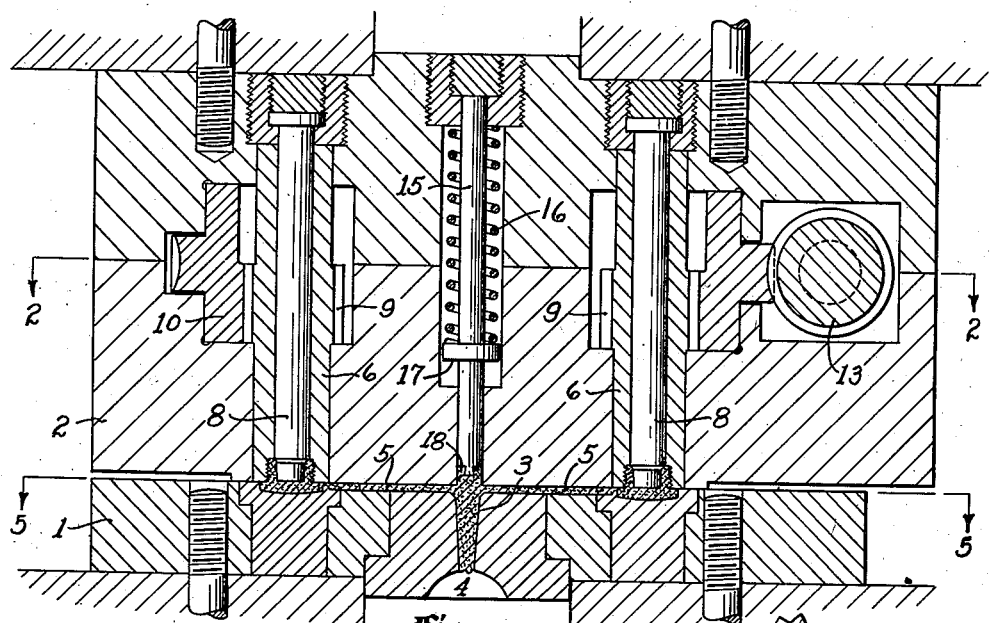
Fig. 1 is a vertical cross sectional view through a mold and ejecting means embodying the principles of the present invention.
Figure 2:
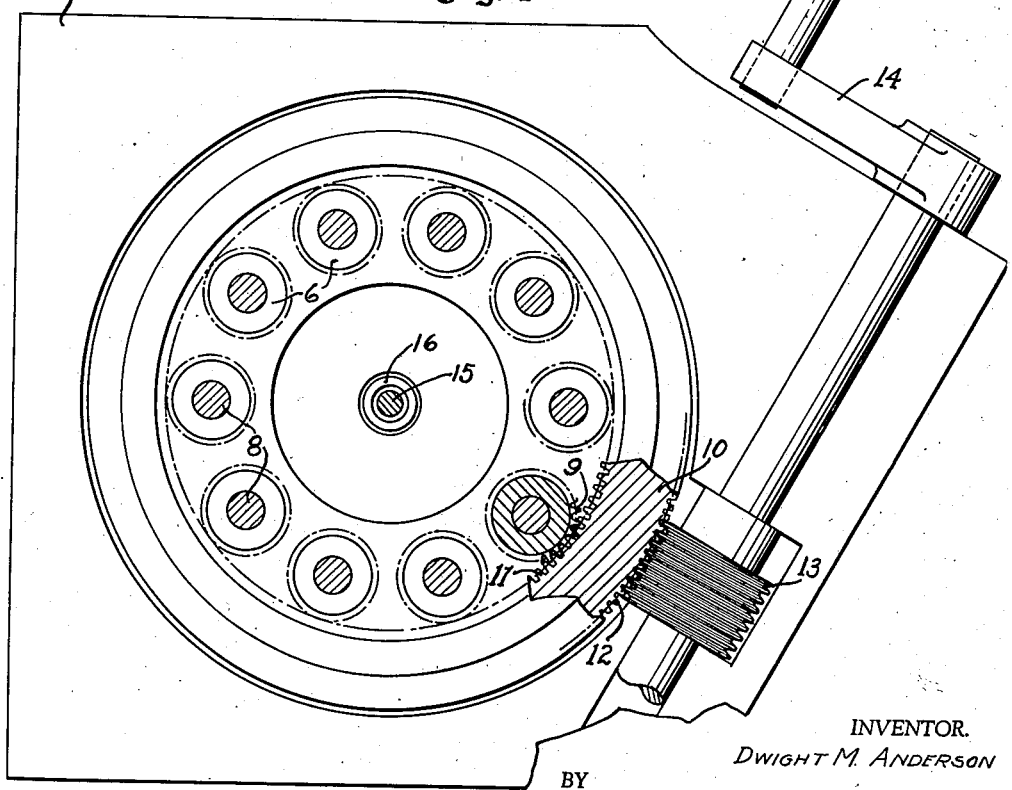
Fig. 2 is a horizontal sectional view through a portion of the mold and is taken on a plane indicated by the line 2—2 of Fig. 1.

Referring to the drawings, a preferred embodiment of the present invention is shown for purposes of illustration and includes a lower mold section 1 and an upper cooperating mold section 2 which when placed together define the cavities for a plurality of articles to be molded.

The lower mold section 1 is provided with a sprue passage 3 which leads from a nozzle seat 4 to suitable gate channels 5 formed at the parting surface of the mold sections. In the illustrative form of the invention, the apparatus is for molding a plurality of articles of thermoplastic material, such as cellulose acetate, wherein the threads are to be molded directly in the material itself, the use of the invention in connection with the die casting or molding of other materials, either by pressure molding or otherwise, or by casting of a coating on threaded preformed inserts being readily apparent therefrom. The application of the invention to a single article having a plurality of transversely spaced threaded portions is apparent also.

In the molding of thermoplastic material, the material is discharged into the mold cavities through the sprue at relatively high pressures, suitable injection nozzles being provided which seat snugly in the nozzle seat 4. The channels 5 preferably terminate at the parting surface of the mold sections and are closed at the open face by a cooperating surface of the mold section 2. The channels 5 lead respectively to the mold cavities defining the articles to be molded, forming runners therebetween.

Figure 5:
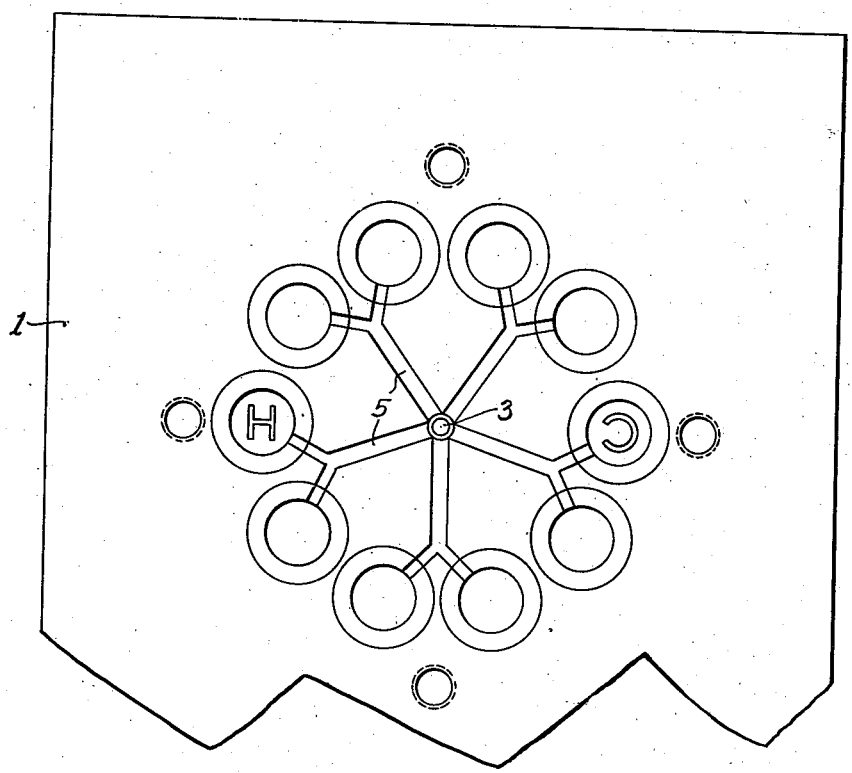
Fig. 5 is a fragmentary plan view of one of the mold portions taken on the parting surface of the mold as indicated by the line 5—5 of Fig. 1, and shows the article cavities and their interconnection through associated gates.

In the form illustrated, the apparatus is shown in connection with the molding of externally threaded caps 20 for designating hot and cold water on water faucet handles, the designating head portion of the caps being formed by a cavity portion included in the mold section 1, as shown in Fig. 5. The threaded neck portion of each cap is formed by a cavity in the mold section 2. The mold cavities for this threaded portion of the caps are in separate rotatable mold spindles 6 which are preferably cylindrical and extend normal to the parting surface of the mold sections, the ends of the spindles defining part of the parting surface. In each of the mold spindles 6 is an internally threaded mold cavity 7 coaxial with the axis of the associated mold spindle.

Each of the mold spindles 6 is mounted in the mold section 2 for rotation about its own axis on a central combined pin and mandrel 8 which is fixedly secured in the mold section 2. For rotating the mold spindles 6, each of the spindles is provided with external gear teeth 9 which cooperate with teeth 11 of an annular internal toothed ring gear 10 which is mounted for rotation in the mold section 2. Suitable means are provided for rotating the ring gear 10. For example, such rotation may be effected by providing on the ring gear suitable external teeth 12 which cooperate with the worm gear 13 mounted in the mold section 2 and rotatable by means of a suitable crank 14. The mold spindles 6 are uniformly distributed circumferentially of the ring gear and all are continuously in mesh therewith so that upon operation of the worm gear 13 all of the mold spindles will be rotated simultaneously an equal amount. The spindles 6 are preferably entirely or partially constrained from axial movement by suitable shoulders.

After the material injecting operation, the removal of the lower mold section 1 from the articles is effected while the articles are held by the spindle threaded portions in the cavities in the mold section 2. All of the caps 20 may be freed and ejected from the mold section 2 and mold spindles 6 concurrently by the screw action of the threads of the mold spindles and the cooperating threads formed thereby on the caps.

Each of the caps 20 is held in fixed position with respect to the others by virtue of their interconnection by the material in the gates 5, and each cap is thus prevented from rotating about its own axis. Therefore, upon rotation of the mold spindles 6, the resultant relative rotation between each mold spindle 6 and its associated cap, screws the cap out of the associated mold spindles, the direction of rotation of the ring gear 10 being determined by the particular right or left hand thread provided on the caps.

In this manner all of the caps are screwed out of the cavities of the mold section 2 concurrently and are entirely freed from the cavities while retaining their fixed position with respect to each other. After being freed from the cavities of the mold section 2, they are held together by the gate material for ease in handling. It is desirable, however, that the interconnected caps be moved into spaced relation from the mold section 2 and thus disposed in a position in which they are readily accessible to the operator. For this purpose a supplemental ejecting means is provided.

In the form illustrated, the supplemental ejecting means comprises an ejecting pin 15 mounted in a suitable bore in the mold section 2 and urged axially toward the parting surface of the mold sections by a spring 16. The pin 15 is provided with a limiting shoulder 17 and an operating end 18 so positioned relative to the shoulder 17 that, when the pin is in the fully extended position as limited by the shoulder 17, the operating end 18 is disposed the desired distance beyond or with respect to the parting surface of the mold section 2. This operating end portion 18 of the pin is preferably in direct alignment with the sprue passage 3 so that the initially injected material which may become slightly chilled before reaching the gates 5, can engage the end of the pin and partially retract the pin within its bore and pass into the bore beyond the gates, thus permitting the unchilled material to enter the gates and pass to the mold cavities, as more fully described in my copending application, Ser. No. 110,569, filed November 13, 1936. During this action, the initial sprue or gate material molds onto the operating end 18 of the pin.

Thus, during the unscrewing of the caps from the mold spindles 6, the pin 15 operates concurrently to urge the articles outwardly from the mold section 2. The operating end 18 of the pin is preferably in the form of a dove-tail, having upwardly convergent surfaces 19, as more fully described in my above identified co-pending application, so that the sprue material entering around the operating end 18 of the pin 15 may be cast firmly thereonto and lie suspended by the end of the pin in spaced relation to and between the mold sections 1 and 2. It is desirable, however, that the entire assemblage of caps be readily removable from the pin by drawing them toward the operator, or by movement parallel to the parting surface. For permitting this operation, the upwardly convergent surfaces 19 of the operating end of the pin are convergent also toward the operator or in a direction parallel to the parting surface. Thus, while the assemblage of caps is held by the upwardly convergent surfaces 19 sufficiently to prevent them from dropping free thereof, as the mold sections are separated, the entire assemblage may be readily removed by drawing it forwardly and horizontally toward the operator, due to the forward convergence of the surfaces 19.

The sprue passage 3 and the ends of the mandrel pin 8 which are received within the caps, are preferably provided with a slight draft in the direction of separation so that all of the molded material of the articles may be separated readily from the mold cavities, sprue passage, and mandrel pins. In those instances in which it is desired to mold material about a preformed threaded insert, the inserts are first installed in the mold spindles 6, preparatory to the molding operation, and thereafter, when coated or embedded in the plastic material, may be removed in the same manner as the integral threaded caps above described.

In connection with Figs. 1 to 6, it will be noted that the mandrel pins 8 are coaxial with the associated mold spindles 6. The operating or mandrel end portions of the pins 8 which are exposed within the threaded mold cavities are preferably formed integral with the pins so as to be stationary with respect to the mold section 2 and provided with a slight draft in the direction of removal from the cavities. As a result, the rotation of the spindles 6 is resisted only by the circumferential frictional resistance of the threaded mold cavity portions and not by any circumferential frictional resistance of the mandrel portions of the pins 8 or appreciable axial resistance. At the beginning of the ejecting operation, the fixed mandrel ends hold the caps and reduce the strain on the gate material in preventing rotation of each cap with its associated spindle. After the initial adhesion between the thread surfaces of the spindles and caps is broken, the strength of the gate material is ample to resist turning of the caps. The sprue passages 5 are preferably relatively shallow in the direction normal to the parting surface of the mold and wider in the direction parallel to the parting surface so that the greatest strength is provided in the direction required for resisting the tendency of the caps 20 to rotate with the spindles 6 during the ejecting operation.

After the caps are entirely freed from the cavities by rotation of the spindles the gate material need support only the dead weight of the finished articles, consequently appreciable rigidity parallel to the direction of separation of the mold is not required.

Figure 7:
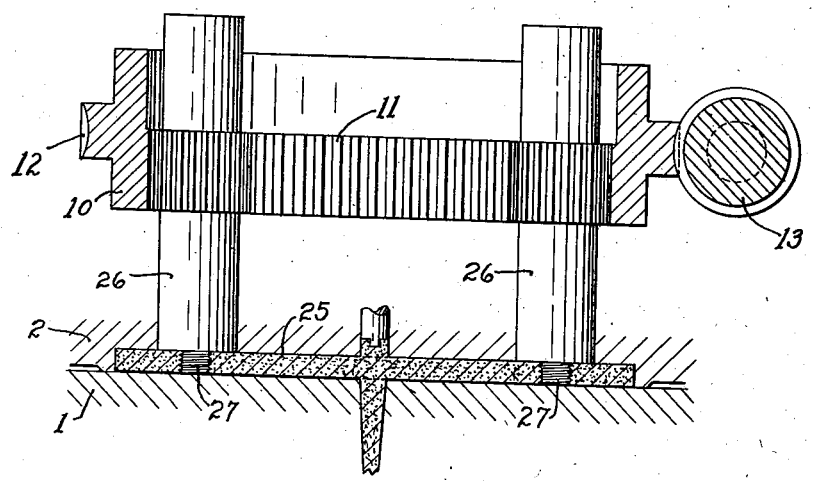
Fig. 7 is a fragmentary sectional view showing only the operating parts of a modification of the apparatus.

As mentioned above in the objects of the invention, it is sometimes desirable to employ the present apparatus for molding a single article 25 having a plurality of transversely spaced parallel threaded portions. For this purpose the apparatus illustrated in Fig. 7 is provided wherein instead of a plurality of caps 20 connected by gate material, for preventing rotation of the caps with the associated spindles, each portion of the article 25 constrains the other portion from rotation with the associated spindle 26 and threaded end portion 27.

Thus, by the concurrent rotation of each of the spindles 26 through the driving ring gear 10, the article 25 is thrust from the mold cavity in a direction axially with respect to the spindles. This thrusting or ejecting action is produced by the relative rotation of the threaded portions 27 of the spindles 26 and the threaded apertures in the article 25.

It will be noted from the disclosure of the invention that the lower end portion of spindles 6 and 26 may be flush or parallel with the parting surface of the mold and that the said end portions form part of the defining wall of the mold cavity. The gates 5, however, as shown in Figs. 1, 3 and 5, occur only in the lower mold section I and no recessed or raised surface exists in end portions of the spindles. Thus, the spindles may be stopped in any desired position relative to the mold section 2 after the ejecting operation.

From the foregoing description it will be seen that a unique improvement in gang-molding threaded articles has been provided which will insure the formation of perfect threads, reduce the amount of breakage heretofore inherent in the formation of such articles, and increase the production of molded threaded articles.

Although only two forms which the present invention may assume have been shown and described it will be apparent to those skilled in the art that other modifications thereof may be made without departing from the scope and spirit of the invention as defined in the appended claims.

Having thus described my invention, I claim:

1. In a mold of the class described, in combination, separable mold members which cooperate to provide a plurality of circular cavities interconnected by radially arranged gate recesses leading to the cavities, a plurality of spindles on one of the mold members aligning with the cavities, means to interconnect the spindles for simultaneous rotation, said spindles having threaded surface portions contiguous with the cavity surfaces and which are threaded so as to form threads on the articles to be molded, means to prevent longitudinal movement of the spindles during their rotation so that such rotation will cause ejection of the articles from the spindle threads, and auxiliary ejector means having surfaces arranged to interlock with a portion of the gated material, said auxiliary ejector means including actuating means arranged to force the gated material in a direction parallel to the direction of ejection of the articles by the spindle threads.

2. An apparatus for molding and ejecting an article having a screw threaded portion, said apparatus comprising separable mold sections defining a cavity when the sections are in closed position, a spindle mold element in one section forming a portion of the cavity of that section, means engaging the spindle element in a manner to prevent it from substantial axial movement in the section which carries it, the cavity forming portion of said spindle mold element having a coaxial screw threaded portion, means for rotating the spindle about its axis, gate means between said mold sections for admitting material to be molded into the cavity from a side thereof, a stationary forming mandrel carried by the said one section and having one portion disposed in the cavity and another portion extending through and coaxial with the spindle, and means associated with the latter portion of the mandrel for constraining the mandrel from rotation with the spindle.

3. An apparatus for molding and ejecting molded material having screw threaded portions integrally interconnected by another portion of the molded material; said apparatus comprising separable mold sections defining a cavity when the sections are in closed position, a plurality of transversely spaced substantially parallel spindle mold elements in one section forming respective screw-thread-molding portions of the cavity of that section, means engaging the spindle elements in a manner to prevent them from substantial axial movement in the section which carries them, a channel in one of the sections communicating with a plurality of cavities so as to form such interconnecting portion of the molded material, means for rotating the spindles concurrently about their respective axes for ejecting the molded material from the cavities, and supplemental ejector means movably carried by one section and capable of becoming operatively interlocked with the interconnecting material so as to move and suspend the material in spaced relation between both the mold sections upon removal of the screw-thread molding portions of the spindles from the material.

4. An apparatus for molding and ejecting an article having a screw threaded portion, said apparatus comprising separable cooperating mold sections defining a cavity when in closed position, a gate passage between the mold elements leading into the cavity for conducting material to be molded into the cavity, a sprue passage in one of the mold elements connecting with the gate passage and at an angle thereto, a rotatable thread-forming member carried by another of the mold elements and forming a portion of the cavity of that section, means to prevent substantial movement of the thread-forming member in the direction of its rotational axis, means for rotating the thread forming member to eject molded material from the cavity, one of the mold sections having a bore intercepting one of said passages, and supplemental ejecting means movable in the bore and adapted to exert force in the ejecting direction on material which is molded in the passage intercepted by the bore.

5. A mold comprising separable mold sections, which in closed position define a plurality of article-forming cavities, each cavity being circular and having exposed therein a screw threaded mold member for forming threads on the molded articles, said screw threaded mold members being rotatably mounted in one of the mold sections and fixed against movement therein, axially of the threads, means drivingly interconnecting the threaded mold members for simultaneous rotation of them, channel forming means on one of the mold sections externally of the article forming cavities and operative to connect by mold runners a plurality of the articles for restraining relative rotation between each article and its associated threaded mold member when said mold sections are separated and the threaded mold members are rotated in a manner to eject the articles from the section which carries the threaded mold members.

DWIGHT M. ANDERSON.